Nov. 13, 1951     R. F. E. STEGEMAN     2,574,766
SPECTACLE WITH ADJUSTABLE MULTIFOCAL LENS
Filed July 20, 1949
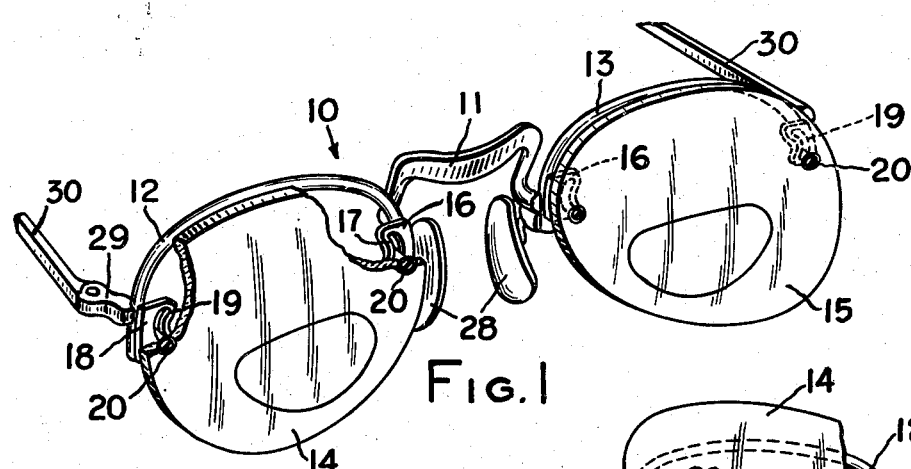
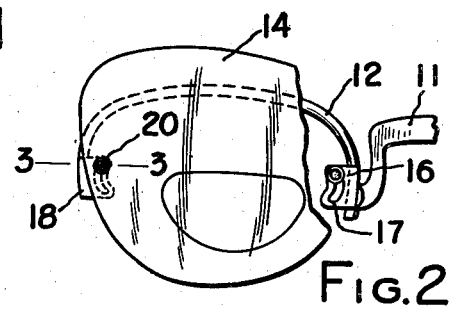
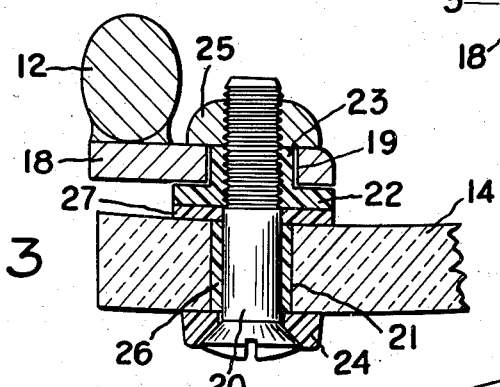
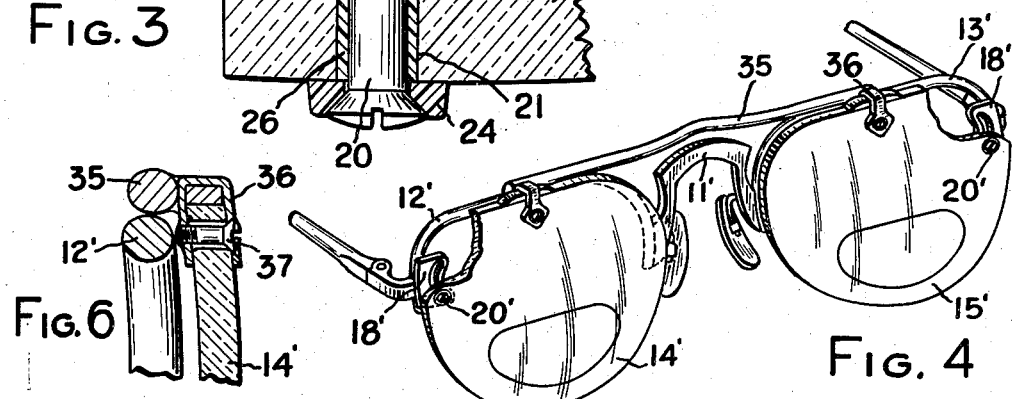
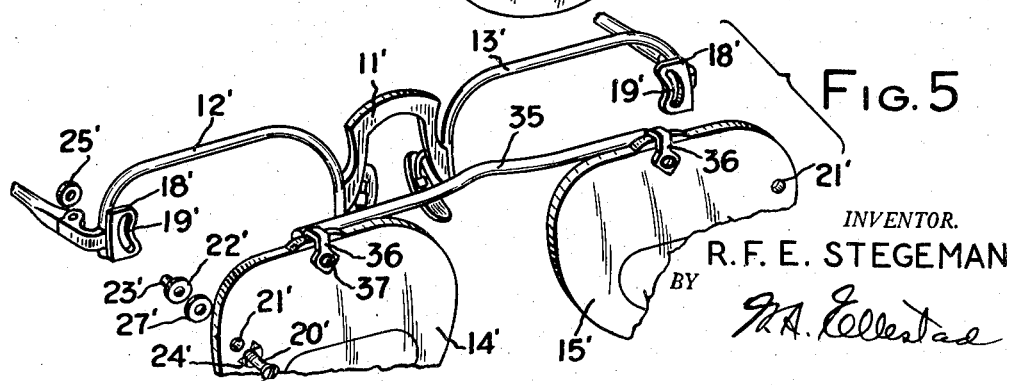
INVENTOR.
R. F. E. STEGEMAN Patented Nov. 13, 1951

2,574,766

UNITED STATES PATENT OFFICE 2,574,766

SPECTACLES WITH ADJUSTABLE MULTIFOCAL LENSES

Raymond F. E. Stegeman, Greece, N. Y., assignor to Bausch & Lomb Optical Company, Rochester, N. Y., a corporation of New York Application July 20, 1949, Serial No. 105,681

5 Claims. (Cl. 88—47)

This invention relates to spectacles and more particularly it has reference to spectacles which embody multifocal lenses which may be selectively raised or lowered to locate the different vision fields of the lenses so as to afford maximum comfort and efficiency in use.

One of the objects of my invention is to provide a spectacle of the type described which will be neat in appearance, simple in structure and efficient in use. Another object is to provide such a spectacle having a frame member on which the lenses are slidably mounted on slideways carried by the temporal portions of the frame. A further object is to provide in such a device a resilient frame carrying slidably mounted lenses and so constructed that the resilience of the frame holds the lenses in adjusted position. Still another object is to provide a semi-rimless spectacle in which the lenses are slidably mounted in front of the frame member for vertical adjustments.

These and other objects and advantages reside in certain novel features of construction, arrangement and combination of parts as will hereinafter be more fully described and pointed out in the appended claims.

Referring to the drawings:

Fig. 1 is a perspective view of a spectacle embodying my invention, with parts broken away, showing the lenses in the adjusted "down" position.

Fig. 2 is a fragmentary view showing the relation of the parts when the lens is in the adjusted "up" position.

Fig. 3 is an enlarged sectional view taken on line 3—3 of Fig. 2.

Fig. 4 is a perspective view of a modified form of my invention, with parts broken away.

Fig. 5 is an exploded view of same.

Fig. 6 is a vertical sectional view taken through the strap at the top of the lens in Fig. 4.

A preferred embodiment of my invention is shown on the drawings wherein 10 indicates, generally, a semi-rimless type of spectacle having a bridge 11 which connects the two spaced, resilient frame members 12 and 13 which are respectively positioned rearwardly of the spaced multifocal lenses 14 and 15 and extend along the nasal, top and temporal edges thereof. Secured to the nasal sides of the respective frame members, so as to overlie the rear surfaces of the lenses, are the projections 16 which have vertically positioned arcuate slots 17. Similar projections 18 having arcuate slots 19 are secured to the temporal sides of the frame members.

The lenses 14 and 15 are attached to the respective frame members 12 and 13 by fastening elements such as screws 20 which pass through apertures 21 formed in the nasal and temporal portions of the lenses. Internally threaded bushings 22 have reduced portions 23 which are slidably mounted in the slots 17 and 19 of the projections 16 and 18. The heads of the screws 20 engage metal washers 24 which contact the front surfaces of the lenses and the screws are threaded into the bushings 22 and locked thereon by the threaded nuts 25. Bushings 26 and washers 27, all formed of a soft, yieldable plastic material, serve to cushion the contacts between the lenses and the screws 20 and the metal bushings 22.

The lenses 14 and 15 are thereby slidably held on the respective frame members 12 and 13 and each lens is individually adjustable in a vertical direction. In the normal or "down" position of the lenses, shown in Fig. 1, the bushings 22 are positioned in the lower ends of the slots 17 and 19 and are held in this position by the resilience of the frame members 12 and 13. Each lens is separately moved upwardly so as to position the lenses in the "up" or reading position when it is desired to place the reading portions of the lenses in front of the eyes for extended periods of reading or close work. When the lenses are thusly positioned, as shown in Fig. 2, the bushings 22 are in the upper ends of the slots and are held therein by means of the resilience of the frame members 12 and 13. The nose pads 28 are secured to the nasal portions of the frame members, while the temporal sides of the frame members carry the endpieces 29 for pivotally supporting the temples 30.

A modification of my invention is shown in Figs. 4, 5, and 6 wherein the resilient frame members 12' and 13' are connected by the bridge 11'. Only the temporal sides of the frame members 12' and 13' are provided with projections 18' which overlie the rear surfaces of lenses 14' and 15' and have the vertical, arcuate slots 19'. The temporal sides of the lenses 14' and 15' have the apertures 21' for receiving the screws 20' which are threaded into the bushings 22' having the reduced portions 23' which are slidably mounted in the slots 19'. The screws are locked to the threaded bushings by means of the nuts 25'. The washers 24' contact the front faces of the lenses and the soft yieldable plastic washers 27' cushion the lenses. Although the screw assembly has been shown only with respect to one lens, it is to be understood that a similar screw assembly will be used to fasten the temporal portion of the other lens to the frame member 13'.

The lenses 14' and 15' are connected by an auxiliary bridge member 35 having its ends soldered to the respective lens straps 36 which are attached to the top edges of the lenses by means of screws 37. The bridge member 35 is preferably relatively rigid so that the resilience of the frame members 12' and 13' holds the lenses in adjusted position as in the first embodiment. However, the bridge member 35 could also be resilient and so tend to hold the lenses in adjusted position. Since the lenses 14' and 15' are connected together, they will move up and down as a unit rather than separately as in the embodiment which was first described.

Various modifications may obviously be made without departing from the spirit of my invention as pointed out in the appended claims.

I claim:

1. In a spectacle construction, the combination of a multifocal lens, a resilient frame member positioned rearwardly of and extending along the nasal, temporal and top portions of the lens, projections secured, respectively, to the nasal and temporal portions of the frame member and overhanging the rear surface of the lens, each of said projections having a vertically positioned arcuate slot with the concave sides of the slots facing in opposite directions, fastening elements secured to the nasal and temporal sides of the lens, said elements projecting rearwardly of the lens and slidably mounted in the respective slots whereby the lens may be vertically adjusted relative to the frame member, the resilience of the frame member holding the elements in the upper or lower ends of the slots whereby the lens is held in adjusted vertical position.

2. A spectacle construction as recited in claim 1 wherein the fastening elements comprise screws which secure the lens to threaded bushings which are slidably mounted in the respective slots.

3. In a spectacle construction, the combination of frame means, vertically movable multifocal lens means positioned adjacent to and in front of the frame means, spaced members on the frame means overlying the lens means, said members having vertically positioned arcuate slots with the concave sides of the slots facing each other, a threaded member slidably mounted in each slot and screws passing through holes in the lens means and threaded into said threaded members, and resilient means applying tension to the members to yieldably hold the threaded members in the upper or lower ends of the slots whereby the lens means may be selectively held in vertically adjusted position.

4. In a spectacle construction, the combination of frame means, vertically movable lens means positioned adjacent to the frame means and in a plane which is substantially parallel to and in front of the frame means, at least one pair of spaced members on the frame means overlying the lens means, each of said members having a vertically positioned arcuate slot with the concave sides of the slots on each pair of members facing each other, fastening elements secured to the lens means and projecting rearwardly therefrom, said elements being slidably mounted in said slots whereby the lens means may be vertically adjusted relative to the frame means and resilient means applying tension to the elements for selectively holding the elements in the upper or lower ends of the slots.

5. In a spectacle construction, the combination of a multifocal lens, a frame member positioned rearwardly of the lens and extending along the nasal, temporal and top portions thereof, projections secured, respectively, to the nasal and temporal portions of the frame member and overhanging the rear surface of the lens, each of said projections having a vertically positioned arcuate slot, the concave sides of the slots facing in opposite directions, fastening elements secured, respectively, to the nasal and temporal portions of the lens and slidably mounted within the adjacent slots and resilient means for selectively holding the elements in adjusted positions at the upper and lower ends of the slots whereby the lens may be vertically adjusted to selectively position the vision fields of the lens before the eye of the wearer.

RAYMOND F. E. STEGEMAN.

REFERENCES CITED

The following references are of record in the file of this patent:

UNITED STATES PATENTS

| Number | Name | Date |
| --- | --- | --- |
| 466,597 | Borsch | Jan. 5, 1892 |
| 935,756 | Guilford | Oct. 5, 1909 |
| 1,650,236 | Rollins | Nov. 22, 1927 |
| 1,742,049 | Rollins | Dec. 31, 1929 |
| 2,058,969 | Fishman | Oct. 27, 1936 |

FOREIGN PATENTS

| Number | Country | Date |
| --- | --- | --- |
| 66,451 | Germany | Jan. 2, 1893 |
| 16,123 | Great Britain | of 1895 |
| 297,156 | Germany | Mar. 27, 1917 |
| 493,390 | Germany | Mar. 6, 1930 |